United States Patent [19]
Evans

[11] Patent Number: 5,458,780
[45] Date of Patent: Oct. 17, 1995

[54] METHOD OF TREATING WASTE WATER

[76] Inventor: Vincent H. Evans, 1438 Crescent Dr. #101, Carrollton, Tex. 75006

[21] Appl. No.: 361,100

[22] Filed: Dec. 21, 1994

[51] Int. Cl.[6] .................................................. B01D 11/00
[52] U.S. Cl. ........................ 210/634; 210/259; 210/805; 210/806
[58] Field of Search .................... 210/634, 770, 210/774, 805, 806, 259

[56] References Cited

U.S. PATENT DOCUMENTS

| | | | |
|---|---|---|---|
| 4,124,502 | 11/1978 | Leman | 210/21 |
| 4,208,282 | 6/1980 | Becker | 210/44 |
| 4,728,428 | 3/1988 | Broussard | 210/634 |
| 4,790,943 | 12/1988 | Dunne et al. | 210/705 |
| 4,948,512 | 8/1990 | Gotlieb et al. | 210/705 |
| 4,966,713 | 10/1990 | Keys et al. | 210/705 |
| 5,049,256 | 9/1991 | Luce | 210/757 X |
| 5,167,829 | 12/1992 | Diamond et al. | 210/708 |
| 5,173,190 | 12/1992 | Picek | 210/651 |
| 5,186,817 | 2/1993 | Paspek et al. | 208/188 |
| 5,207,921 | 5/1993 | Vincent | 210/704 |
| 5,269,939 | 12/1993 | Laurent et al. | 210/705 |
| 5,286,386 | 2/1994 | Darian et al. | 210/639 |

*Primary Examiner*—Frank Spear
*Attorney, Agent, or Firm*—H. Dennis Kelly; Jeffrey T. Hubbard; Timmons & Kelly

[57] ABSTRACT

The waste stream is mixed with a solvent that absorbs the oily material without dissolving in the water phase. The remaining water/solids mixture is then separated by vibratory screening, and the solids are again contacted with solvent to remove the bulk of the remaining oily material. The remaining mostly solid material is screened again and then dried to remove any remaining solvent. The solvent is processed to remove the dissolved oily material, which is then sold or discarded. The water from the screening and drying steps is processed to remove any solvent entrained with the water, and the resulting solvent, solids and oil-free water is discharged.

8 Claims, 1 Drawing Sheet

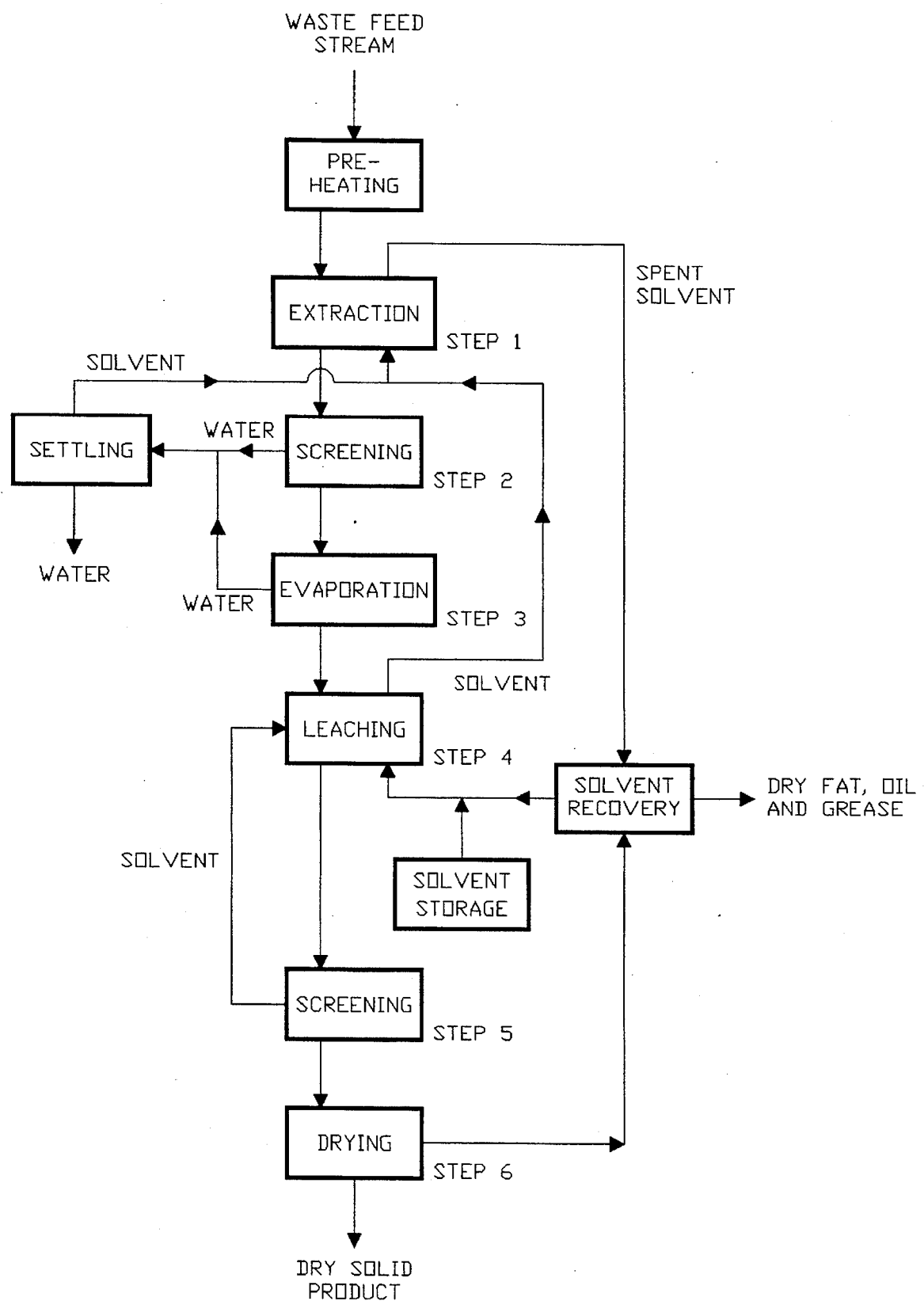

METHOD OF TREATING WASTE WATER

BACKGROUND OF THE INVENTION

1. Field of the Invention

This invention relates in general to processes for treating waste water skimmings. In particular, the invention relates to processes for separating streams comprising water, oily material, and solids in varying percentages, into: a dry solid product containing low percentages of fats, oils and greases; a dry, solids-free oily product; and an oil-free, solids-free water stream.

2. Description of the Related Art

Waste water skimmings from food processing plants generally consist of mixtures and emulsions of a continuous water phase and a discontinuous oil phase, with varying percentages of entrained solids. These mixtures tend to be difficult to separate by conventional means. Also, the solids produced by most of the available processes have relatively high percentages of oily material and are often unsuitable for commercial purposes and must be discarded.

Conventional methods for processing these types of streams use evaporation, centrifuging and other energy intensive processes for separating the water and oily material. For example, U.S. Pat. No. 4,728,428, issued to Broussard, Sr., on Mar. 1, 1988, discloses a method utilizing a wet spiral absorber/contactor. The mixture of solvent and oily water is then separated in a settling tank. This method does not address treatment of liquid streams containing any substantial amount of solids.

U.S. Pat. No. 5,186,817, issued to Pakpek et al., on Feb. 16, 1993, discloses a process for treating mixtures of petroleum compounds and water by inverting the oil/water emulsion using high shear mixing. The process requires analysis of the mixture to ensure that the emulsion is inverted. The process also uses pressurized vessels and other equipment that raise its construction costs.

A need remained for a waste treatment process capable of inexpensively separating the oily material and solid components from waste water skimmings and turning them into higher value products. A process requiring less energy consumption for each pound of material processed was also desired. In addition, a process that requires inexpensive, commonly available equipment was desired. A process that operates predominantly at about atmospheric pressure and temperatures common in food processing plants (below 225 degrees Fahrenheit [107 degrees Celsius]) was also desired.

SUMMARY OF THE INVENTION

The general object of the invention is to remove solids and oily material from waste water skimmings. At the same time, objects of the invention are to produce a dry solid product that contains less than ten percent fats and oils by weight, and to produce a dry, solids-free product comprising oily material from the waste stream. These objects are achieved by a multi-stage extraction using a solvent that is miscible in the oily material and immiscible in water. The unextracted material is screened and the bound water is removed by evaporation. The remaining material is then contacted with more solvent. The wet mixture is leached with more solvent, and screened once more. The remaining wet solids are dried to remove the remaining solvent. Water separated from the solids during the screening and drying stages is sent to a settling tank to remove any entrained solvent. Solvent containing oily material is sent to a recovery process to separate the solvent from the oily material, returning the solvent to the process and discharging dry, solids-free oily material as product.

Another object of the invention is to perform the separation of the skimmings into its product streams using less energy per pound of processed material than conventional methods. This object is achieved by using a screening step after the extraction and leaching steps to separate the liquid and solid phases, and by separating any solvent removed with the water by settling. In addition, vacuum distillation is used for separating the solvent from the oily material absorbed in the solvent during extraction and leaching.

Yet another object of the invention is to provide a process that can be constructed at minimal capital cost. This objective is achieved by running the process at temperatures at or below 225 degrees Fahrenheit (107 degrees Celsius) and pressures below 15 psi (103 kPa). Thus, vessels and piping need not meet ASME Code § VIII, Div. 1 and similar codes for pressurized vessels, which would require more expensive equipment.

The above, as well as additional objects, features, and advantages of the invention will become apparent in the following detailed description.

BRIEF DESCRIPTION OF THE DRAWINGS

The FIGURE is a block schematic of a method of treating waste water skimmings according to the invention.

DESCRIPTION OF THE PREFERRED EMBODIMENT

In the following discussion, the term "FOG" refers to a mixture of fats, oils, and greases that may be present in the material to be processed. "Spent solvent" refers to solvent that has absorbed FOG during the process, and "fresh solvent" refers both to new, uncontaminated solvent and to spent solvent that has had all significant quantities of FOG and contaminants removed. "Extract" is defined as the solvent-rich phase from an extractor containing the solvent-miscible components. "Raffinate" is defined as the solvent-lean phases from an extractor containing the components not removed by extraction. Unless otherwise indicated, all percentages are by weight.

Feed composition will vary with the plant type and waste source. A typical feed for processing is waste water skimmings produced in a meat packing plant. The stream would contain: a water phase; solids such as meat trimmings, bone fragments, gristle, and dust; and an oily phase comprising animal fats and oils. Other sources of waste feed streams for processing might be petroleum refining storm drains and wash down drains, municipal water treatment plants, and food processing plants.

The particular choice of solvent will vary with the feed composition and the type of plant. The solvent is a liquid at atmospheric pressure and temperature less than 212 degrees Fahrenheit (100 degrees Celsius). The solvent is lighter than water, i.e., it has specific gravity less than one, and is immiscible in water, while being at least moderately soluble with the oily phase of the waste stream. The solvent should have significantly lower vapor pressure than water or the FOG for the range of pressures used in the method, in order to facilitate separation by traditional methods. It is also preferred that the solvent have physical properties allowing for separation from the oily phase at low temperature and pressure, if distillation is employed for recovering the solvent. Toxicity, flammability, cost, and other aspects may also be of concern for a particular application. One acceptable solvent is para-cymene, also known as 1-isopropyl-4-methylbenzene.

The FIGURE shows a block schematic of the proposed method for treating waste water skimmings. The waste feed stream is a combination of a water phase; an oily phase comprising fats, oils and greases in varying proportions; and entrained solids. In some cases the FOG will be solid at ambient temperature, such as with fat trimmings from meat. The solids could be of any material, but are generally insoluble in either the oily or water phases. The water phase is generally larger in volume than the oily phase.

In some cases, the waste feed stream is preheated, preferably in the range of 130 to 150 degrees Fahrenheit (54 to 66 degrees Celsius). This is because the animal fats are often solid at ambient temperatures. Preheating the waste feed stream ensures that all the FOG is liquified.

In the first step, the waste feed stream goes through an extraction step, in which the waste feed stream is contacted with solvent. A simple vertical pipe, without trays, packing, or other internal components, is used in this step. In continuous operation, the solvent enters at the bottom, and the waste feed stream enters at the top of the extractor. Gravity will promote mixing of the streams and subsequent absorption of the FOG by the solvent. The spent solvent is taken to a recovery process, which will be discussed below, and the remaining waste feed stream, from which seventy to ninety-five percent of the FOG has been removed by the solvent, is sent on to the next processing step.

Batch operation is envisioned, with the solvent being recirculated through the extractor for a time to promote extraction of more of the FOG from the waste feed stream. The extraction step may be carried out in a semi-batch or continuous form as well, depending on the particular application. In addition, the extraction step may be carried out in a single vessel or multiple vessels as desired.

In the second step, the waste stream is conveyed over a vibrating screen to remove water from the waste stream. This method of separating the water is considerably more energy efficient than use of evaporation and centrifuges, and can be performed with relatively inexpensive, off the shelf equipment that is well known in the art. Complete removal of the water does not occur, since some of the water will adhere to the solids. The size of the screening will vary depending on the size and shape of the solids in the waste stream.

In the third step, the water still remaining in the waste stream is removed by evaporation. Solvent may be added to the screened solid waste prior to evaporation. After the water is evaporated, a mixture of solvent and waste solids remains and passes on to the next step.

The water removed in the second and third steps is sent to a settling tank to remove any entrained solvent that is inadvertently drawn out with the water. The solvent from settling is returned to the process, preferably by adding it in with the solvent used in the extraction step. The water from the settler, now free of solvent, FOG and solids, is discharged. Water-soluble contaminants are not addressed by this process, and must be processed by conventional water treatment methods if necessary.

In the fourth step, the remaining solids are leached, i.e., contacted with fresh solvent to remove the remaining FOG. This leaching step can be more effective than the preceding extraction step, because removal of the water allows the solvent to contact the oily phase more completely. Again, the step may be performed in batch, semi-batch or continuous form, in a single vessel or multiple vessels.

In the fifth step, the damp solids are conveyed over a vibrating screen to remove solvent from the solids. This step is similar to the second step, except that the screened liquid is mostly solvent, and is returned to the leaching step just described, instead of to the settling tank.

In the final step, the remaining solvent is removed by evaporation. The resulting dry solids contain less than ten percent FOG by weight.

A solvent recovery process is utilized to separate the solvent and the absorbed FOG. Separation may be achieved by any process known in the art, although vacuum distillation is preferred because of its lower operating temperature. A lower temperature is preferred to prevent discoloring of the FOG. The solvent recovery process would produce dry, solids-free FOG as a product, and fresh solvent for reintroduction to the process.

New solvent, and fresh solvent from the solvent recovery process which is not being used for operation, can be kept in a solvent storage tank. Material from the storage tank is added to the solvent stream going to the leaching step.

A countercurrent flow scheme is preferred to promote more effective absorption of the FOG in the waste stream by the solvent. In such a scheme, fresh solvent would enter the leaching step at the point where the waste stream leaves the leaching step, and slightly spent solvent would leave at the point where the waste stream enters. In the case of multiple vessels, this scheme would be followed in turn for each vessel, the waste stream from each preceding vessel going to the next vessel, and the solvent from the each subsequent vessel to the preceding vessel. The spent solvent coming from the first vessel would then be sent to the extraction step. The same flow scheme is carried out in the extraction step, with the spent solvent leaving the extraction step at the point where the waste stream enters° The spent solvent from the extraction step is then taken to solvent recovery.

The following example is illustrative of the inventive process. Raw skimmings were taken from the dissolved air flotation unit of a poultry processing plant. The raw skimmings had a composition of 82.1% by weight water phase, 14.1% by weight oily phase, and 3.8% by weight solids. A batch of 222 parts by volume of this feed was preheated to 150 degrees Fahrenheit (65.6 degrees Celsius) and placed in a column made of a 48 inch (122 centimeter) length of two-inch (5 centimeter) schedule 40 polyvinyl chloride (PVC) pipe. A batch of 778 parts by volume of Extract #2 from a prior run, containing solvent and FOG, was added to the column and circulated through the column by taking material from the top of the column and pumping it into the bottom of the column at a rate adequate to mix the components. Material was circulated for 25 minutes, followed by settling for five minutes. The lighter phase was decanted from the column and labeled Extract #1. All but 265 parts by volume of the raffinate was then drained from the column. To this was added 558 parts by volume of Extract #3 from a prior run. Extract #3 contained solvent and a lesser percentage of FOG than Extract #2. The material was circulated for 35 minutes, and allowed to settle for five minutes. The lighter phase was decanted from the column and labeled Extract #2. The raffinate was filtered on a 250 mesh stainless steel screen. The liquid filtrate contained approximately 33 percent by volume of solvent/fat solution and 67 percent by volume of water. The remaining solids were mixed with solvent and heated until a 230 degree Fahrenheit (110 degrees Celsius) azeotrope formed. The lighter phase of the remaining material was decanted off and labeled Extract #3. The remaining solids were mixed with 182 parts by volume of fresh solvent for three and a half minutes, then filtered on a 250 mesh stainless steel screen. 26.7 grams of wet cake was recovered from the screen and dried under a vacuum at 230 degree Fahrenheit (110 degrees Celsius). The resulting dry cake had a fat content of eight percent by weight.

The method of the invention has several advantages over the prior art. The entire process, except for solvent recovery, can be carried out at atmospheric pressure, minimizing the need for pressure vessels and other equipment that increases construction costs. Operating temperatures are within the range common to the food processing industry. The process uses less energy per pound of processed material than conventional evaporation methods. The solids contain less than ten percent FOG by weight, making the solids more useful and marketable.

The invention has been shown in only one embodiment. It should be apparent to those skilled in the art that the invention is not so limited, but is susceptible to various changes and modifications without departing from the spirit of the invention.

I claim:

1. A method of treating a waste stream having a water phase, an oily phase, and entrained solids, wherein the method comprises the following steps in the order given:
    a) extracting most of the oily phase by mixing the waste stream with a solvent, the solvent being highly miscible with the oily phase and immiscible with the water phase;
    b) screening the remaining waste stream to separate the water phase from the waste stream;
    c) evaporating the remaining water phase from the waste stream;
    d) leaching the remainder of the oily phase from the waste stream by mixing the remaining waste stream with the solvent;
    e) screening the waste stream to separate the solvent from the waste stream; and
    e) drying the remaining solids by evaporating the remaining solvent from the waste stream.

2. A method of treating a waste stream as recited in claim 1, further comprising:
    separating entrained solvent from the water produced in the screening and drying steps;
    returning the solvent to the extraction step; and
    discharging an oil-free, solids-free water stream.

3. A method of treating a waste stream as recited in claim 1, wherein the solvent has lower specific gravity than the water phase.

4. A method of treating a waste stream as recited in claim 3, wherein the solvent is para-cymene.

5. A method of treating a waste stream as recited in claim 1, further comprising recovering the solvent by:
    taking the spent solvent discharged from the extraction step;
    separating solvent from the oily phase material;
    returning the fresh solvent to the leaching step; and
    producing a dry, solvent-free oily product.

6. A method of treating a waste stream as recited in claim 5, wherein the solvent flows countercurrent to the waste stream.

7. A method of treating a waste stream as recited in claim 6, wherein the countercurrent flow of the solvent involves the solvent flowing from the solvent recovery step into the leaching step, through the leaching step in opposite direction to the waste stream flow and out of the leaching step, then into the extraction step, through the extraction step in opposite direction to the waste stream flow and out the extraction step, finally returning to the solvent recovery step.

8. A method of treating a waste stream as recited in claim 1, wherein the waste stream is heated prior to entering the extracting step.

* * * * *